July 14, 1931.  C. A. CADENBACH  1,814,824
CUTTING DIE STRUCTURE
Filed Nov. 9, 1928  2 Sheets-Sheet 1
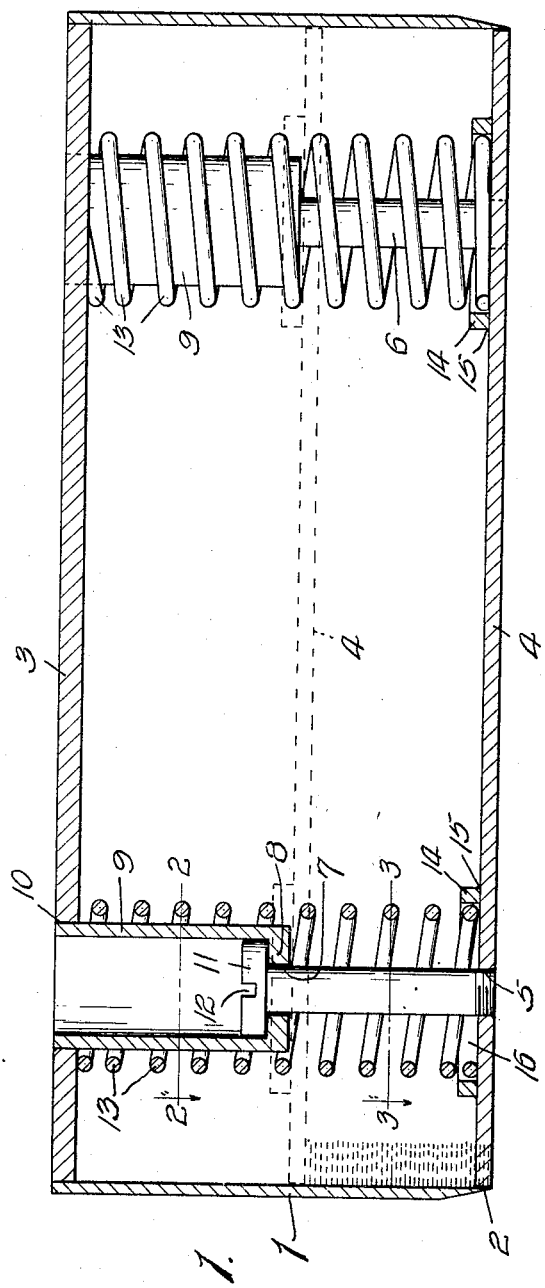
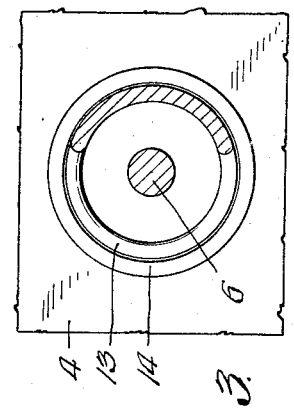
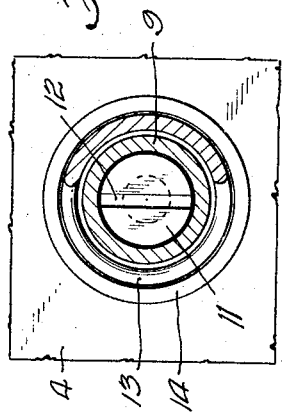
INVENTOR:
BY C. A. Cadenbach.
ATTORNEY.

July 14, 1931.    C. A. CADENBACH    1,814,824
CUTTING DIE STRUCTURE
Filed Nov. 9, 1928    2 Sheets-Sheet 2
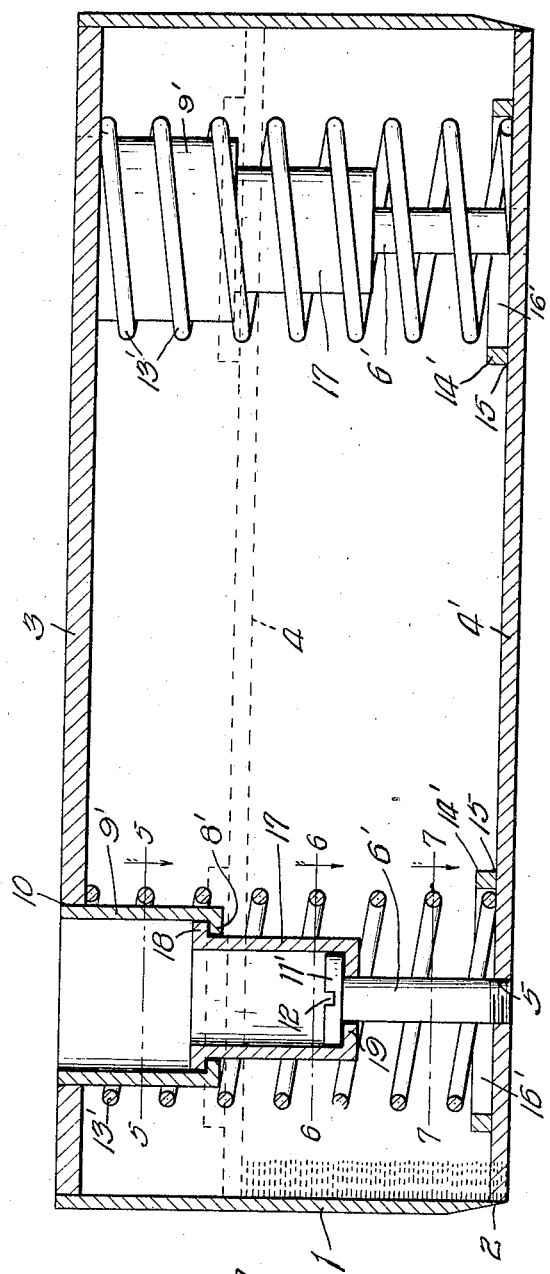
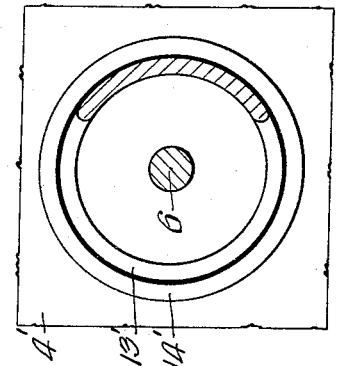
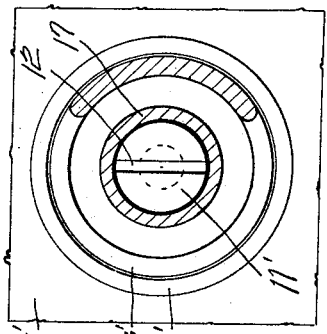
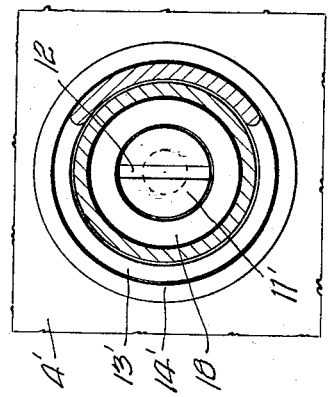
INVENTOR:
BY C. A. Cadenbach.
ATTORNEY.

Patented July 14, 1931

1,814,824

UNITED STATES PATENT OFFICE

CHRISTIAN A. CADENBACH, OF ST. LOUIS, MISSOURI, ASSIGNOR TO INDEPENDENT DIE & SUPPLY CO., OF ST. LOUIS, MISSOURI, A CORPORATION OF MISSOURI

CUTTING DIE STRUCTURE

Application filed November 9, 1928. Serial No. 318,123.

My invention relates to leather and cloth cutting dies for gloves and shoes, and, more particularly to means for guiding and directing compression and limiting ejecting travel of a cutting die ejector member, and, the invention is a distinct and practical improvement in the art to which it appertains to overcome certain practical objections to, and defects in, the present structures of leather and cloth cutting dies.

A further object of the invention is the provision of a leather and cloth cutting die for gloves and shoes which possesses advantages in points of simplicity and efficiency, and, at the same time proves itself comparatively inexpensive in cost of manufacture.

With the above and other objects and advantages in view, the invention consists in the novel arrangement and combination of parts, as hereinafter more fully described and finally pointed out in the claims hereto appended.

Referring to the accompanying drawings forming a part of this specification, wherein like characters of reference denote similar parts throughout the several views:

Fig. 1 is a longitudinal sectional view of a cutting die, disclosing partly in sectional elevation and partly in side elevation, the means for guiding and directing compression and limiting ejection travel of the ejector.

Fig. 2 is a view taken on line 2—2 of Fig. 1.

Fig. 3 is a view taken on line 3—3 of Fig. 1.

Fig. 4 is a view similar to Fig. 1, illustrating a modified form of the invention.

Fig. 5 is a view taken on line 5—5 of Fig. 4.

Fig. 6 is a view taken on line 6—6 of Fig. 4.

Fig. 7 is a view taken on line 7—7 of Fig. 4.

In the practice of my invention, I employ, primarily, an endless cutting die 1, which is preferably made of steel and which has the beveled cutting, or knife edge 2. For glove and some shoe work, the cutting die is provided with a pressure receiving plate 3. The die can be made of any desired plan contour and for purpose of illustration only, I have shown the die of a shape adapted to cut material for gloves.

For illustrative purposes only, I have shown my means for guiding and directing compression and ejection travel of an ejector 4 located within the center of the cutter, or die 1, and opposed to the pressure receiving plate 3 thereof. The ejector is relatively movable and approximating the contour line of the cutting edge of the endless die wall 2. The ejector member 4 is a substantially flat piece of suitable metallic material and is not provided with an edge flange as is common to the manufacture of the present types of ejector members in the art to which this device relates, as by the use of means, as will appear hereinafter, lateral shifting of the ejector relative to the cutting die edge of the die, or vice-versa, is not possible, thus the cutting edge of the die is not subject to injury, as is now the case with the present types of cutting dies.

Suitably connected to the ejector member 4 such as by the screw threaded connections 5, or their equivalent, are stems, or posts 6 which are directed from the ejector 4. One end of each stem 6 passes through an opening 7 in an internal end shoulder 8 of a relatively larger sleeve member 9, the opposite end of which sleeve member is suitably connected to the pressure receiving plate 3 by welding or drive fit, as at 10, or in any equivalent manner. The inner end of each stem 6 is provided with a suitable head 11, preferably, although not necessarily, provided with a tool receiving slot 12, which is receivable and movable within the sleeve member 9 and normally in engagement with the internal end shoulder 8 of the sleeve member 9. Briefly, the stem and sleeve are telescopically connected, with the head of the stem and the internal end shoulder of the sleeve providing head and shoulder means for limiting the extension movement of the stem and sleeve and thereby guiding and limiting the ejection travel of the ejector 4.

Surrounding each sleeve 9 and each stem 6 is a suitable helical spring 13 with its opposite ends in contact with the inner face of the pressure receiving plate 3, or other associated part of a cutting die, and the inner face of the ejector member 4. The end of each spring 13 engaging the ejector 4 is preferably, although not necessarily guided against lateral shifting movement, or displacement by means of a suitable collar 14, which is suitably secured to the inner face of the ejector 4 by brazing, as at 15, or in any equivalent manner, so as to provide a socket 16 within which to receive the one end of each spring 13.

The springs 13 are not in any manner rigidly secured to any of their associated parts, are not concealed within the sleeves and they are of such rigidity and expansion power amply to eject the cut material within the cutting die upon the lifting of the cutting die when cutting pressure is removed from the pressure receiving plate 3, whereby there is a compact and light die having a great travel range for giving an effective ejecting, as it will be observed, without the use of chain or link connections between the pressure receiving plate 3 and the ejector 4, and, wherein the springs 13 are disposed outward of, and surrounding the telescopically united members connected to the ejector plate 4 and pressure receiving member 3, or an equivalent member, dependent upon the type of die structure.

In Fig. 4, I have shown a modification of the means for guiding and directing compression and limiting ejection travel of an ejector or stripper plate used in connection with leather and cloth cutting dies, such as used in glove and shoe factories and especially used with dies where an extra deep cut is to be made.

In this modified form of means, I employ the stem 6' which is connected to the ejector 4' and provided with the slotted head 11', the sleeve member 9' having the internal shoulder 8'; the helical spring 13' and the collar member 14' providing the socket 16'.

The modified feature resides in providing an intermediate sleeve member 17 having an outwardly directed external end shoulder 18 adapted to normally engage the internal end shoulder 8' of the sleeve member 9', in lieu of the head 11' of the stem 6' engaging same, as shown in Fig. 1, and, I provide the opposite end of the intermediate sleeve member 17 with an internal end shoulder 19, which is adapted to normally engage the head 11' of the stem 6'. This arrangement of a double sleeve and a stem telescopically united enable me to provide means for guiding and directing compression and limiting ejection travel of an ejector member, which means will permit the ejector to be compressed a further distance within a limited space of compression than with the single sleeve and stem arrangement shown in Fig. 1.

While I have described throughout the specification and have illustrated, the use of my means for guiding and directing compression and ejection travel of an ejector member within an endless cutting die, it is apparent especially from my co-pending application that the means is applicable to a quite different type of die structure and that the aforesaid means can be located to the outside of and surrounding the die, if desired, dependent, of course, upon what type of cutting die the means is to be applied to.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination with a cutting die including a female member having a cutting edge and an ejector plate therefor, of telescopic means connecting the back of the female member with the ejector plate and for limiting outward movement of the ejector plate, a ring member fixed to the inner face of the ejector plate in axial alignment with the telescopic means, coiled resilient means encircling the telescopic means and contacting at one end with the inner face of the back of the female member and at its opposite end with the inner face of the ejector plate within the bounds of the ejector plate ring member and one member of the telescopic means adapted to engage the inner face of the ejector plate within the bounds of the ring member thereof to limit inward movement of the ejector plate.

2. The combination, in a cutting die structure, a female member having a cutting edge, a plate having a plurality of openings closing one end of the female member, a pair of telescopically united sleeve members carried by the plate of the female member, means limiting the extension of said members, a bolt having a head at one end telescopically connected with the innermost of said sleeve members, an ejector plate movable into said female member, said bolt having screw threaded connection at one end with the ejector plate, a ring member fixed to the inner face of the ejector plate in axial alignment with the sleeve members and a coiled spring encircling the sleeve members and the bolt and having its one end in contact with the plate of the female member and its opposite end in contact with the inner face of the ejector plate within the bounds of the ejector plate ring member, the head of said bolt adapted to limit outward movement of the ejector plate and the inner ends of the sleeve members limiting inward movement of the ejector plate by contacting with the inner face of the ejector plate within the bounds of the ejector plate ring member.

In testimony whereof, I have hereunto affixed my signature.

CHRISTIAN A. CADENBACH.